US010768603B2

(12) United States Patent
Iwamura et al.

(10) Patent No.: US 10,768,603 B2
(45) Date of Patent: Sep. 8, 2020

(54) NUMERICAL CONTROLLER CAPABLE OF CORRECTING A DEVIATION AMOUNT OF A WORKPIECE

(71) Applicant: FANUC CORPORATION, Minamitsuru-gun, Yamanashi (JP)

(72) Inventors: Yamato Iwamura, Yamanashi (JP); Shinichirou Itakura, Yamanashi (JP); Ryuta Hitomi, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 58 days.

(21) Appl. No.: 16/149,352

(22) Filed: Oct. 2, 2018

(65) Prior Publication Data
US 2019/0101890 A1 Apr. 4, 2019

(30) Foreign Application Priority Data

Oct. 4, 2017 (JP) .................................. 2017-194264

(51) Int. Cl.
G05B 19/402 (2006.01)
G05B 19/404 (2006.01)

(52) U.S. Cl.
CPC ......... *G05B 19/402* (2013.01); *G05B 19/404* (2013.01); *G05B 2219/37336* (2013.01); *G05B 2219/50063* (2013.01); *G05B 2219/50074* (2013.01)

(58) Field of Classification Search
CPC ............... G05B 19/402; G05B 19/404; G05B 2219/50074; G05B 2219/50063; G05B 2219/37336; G05B 2219/35026
See application file for complete search history.

(56) References Cited

U.S. PATENT DOCUMENTS

| 5,198,984 A | * | 3/1993 | Yamaguchi | G05B 19/19 318/571 |
| 6,571,145 B1 | | 5/2003 | Matsumiya et al. | |
| 2006/0208681 A1 | * | 9/2006 | Endo | G05B 19/19 318/569 |
| 2010/0305758 A1 | | 12/2010 | Nishi et al. | |

FOREIGN PATENT DOCUMENTS

| JP | 01058458 A | * | 3/1989 | ......... G05B 19/4142 |
| JP | 2000317775 A | | 11/2000 | |
| JP | 2003303005 A | * | 10/2003 | ......... G05B 19/4142 |
| JP | 2010-277425 A | | 12/2010 | |
| JP | 2016-162265 A | | 9/2016 | |

OTHER PUBLICATIONS

Japanese Notice of Reasons for Refusal for Japanese Application No. 2017-194264, dated Oct. 30, 2019 with translation, 6 pages.

* cited by examiner

*Primary Examiner* — Michael D Masinick
(74) *Attorney, Agent, or Firm* — RatnerPrestia

(57) ABSTRACT

A numerical controller for correcting a deviation amount corresponding to a difference between a theoretical value and a measured value of a workpiece includes a machining unit for storing a machining path of the workpiece and an effective offset number during machining of the machining path in association with each other, a measurement unit for storing a deviation amount applied to the workpiece and a measurement point at which the deviation amount is detected in association with each other, and a correction unit for reflecting the deviation amount to the offset number corresponding to the machining path around the measurement point.

2 Claims, 2 Drawing Sheets

NUMERICAL CONTROLLER CAPABLE OF CORRECTING A DEVIATION AMOUNT OF A WORKPIECE

CROSS-REFERENCE TO RELATED APPLICATION

This application is a new U.S. Patent Application that claims benefit of Japanese Patent Application No. 2017-194264, filed Oct. 4, 2017, the disclosure of this application is being incorporated herein by reference in its entirety for all purposes.

BACKGROUND OF THE INVENTION

1. Field of the Invention

The invention relates to a numerical controller, and particularly relates to a numerical controller capable of automatically determining a reflection destination of a deviation amount.

2. Description of the Related Art

A difference (hereinafter referred to as a deviation amount) may occur between a measured value (generally a measurement result by a measurement program) and a theoretical value (a theoretical dimension previously set in the measurement program, generally a design value of a workpiece) of a workpiece after machining in some cases. That is, the workpiece after machining may have a shape not intended by a designer. In this case, an offset number at the time of machining an occurrence position of the deviation amount is identified, the deviation amount is reflected to an offset value associated with the offset number, and additional machining is performed, thereby realizing an intended workpiece shape.

Japanese Patent Application Laid-Open No. 2016-162265 and Japanese Patent Application Laid-Open No. 2010-277425 disclose a numerical controller capable of performing machining using a corrected offset value by an operator inputting a correction amount (corresponding to the above-mentioned deviation amount), which is a difference between a design value and a measured value of a workpiece, in association with a correction number (corresponding to the above-mentioned offset number).

However, in embodiments described in Japanese Patent Application Laid-Open No. 2016-162265 and Japanese Patent Application Laid-Open No. 2010-277425 A, the operator needs to manually input a relationship between the offset number and the deviation amount. To this end, the operator needs to detect an effective offset value at the time of machining a certain position, which is significantly complicated work.

SUMMARY OF THE INVENTION

The invention has been conceived to solve such a problem, and an object of the invention is to provide a numerical controller capable of automatically determining an offset number corresponding to a reflection destination of a deviation amount.

A numerical controller according to an embodiment is a numerical controller for correcting a deviation amount corresponding to a difference between a theoretical value and a measured value of a workpiece. The numerical controller includes: a machining unit for storing a machining path of the workpiece and an effective offset number during machining of the machining path in association with each other; a measurement unit for storing a deviation amount applied to the workpiece and a measurement point at which the deviation amount is detected in association with each other; and a correction unit for reflecting the deviation amount to the offset number corresponding to the machining path around the measurement point.

The machining unit may store a machining path of the workpiece and an effective workpiece coordinate system during machining of the machining path in association with each other, and the correction unit may reflect the deviation amount to the workpiece coordinate system corresponding to the machining path around the measurement point.

According to the embodiments, it is possible to provide a numerical controller capable of automatically determining a reflection destination of a deviation amount.

BRIEF DESCRIPTION OF THE DRAWINGS

The above-described object and characteristic of embodiments and other objects and characteristics will be clear from description of embodiments below with reference to accompanying drawings. In the drawings.

DETAILED DESCRIPTION OF THE PREFERRED EMBODIMENTS

Hereinafter, embodiments will be described with reference to drawings.

Figure 1:
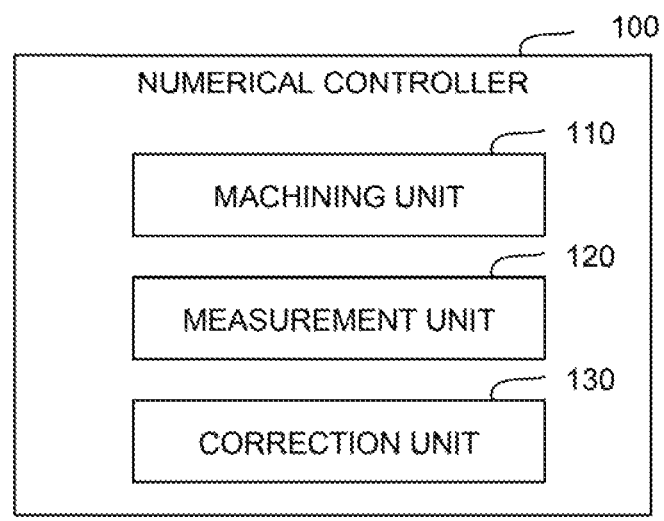
FIG. 1 is a block diagram illustrating a functional configuration of a numerical controller.

FIG. 1 is a block diagram illustrating a functional configuration of a numerical controller 100 according to an embodiment.

The numerical controller 100 includes a machining unit 110 for machining a workpiece, a measurement unit 120 for measuring the workpiece after machining, and a correction unit 130 for automatically performing correction based on a deviation amount.

A typical numerical controller 100 includes a central processing unit (CPU), a storage device, an input/output device, etc., and the machining unit 110, the measurement unit 120, and the correction unit 130 are logically implemented by the CPU executing a program stored in the storage device.

The machining unit 110 machines a workpiece according to a machining program. Alternatively, the machining unit 110 performs machining simulation of the workpiece according to the machining program. The machining unit 110 holds an offset number and an offset value in association with each other. When a certain offset number is validated, the machining unit 110 corrects coordinates of a machining point identified from the machining program based on an offset value corresponding to the offset number. For example, the machining unit 110 has an offset table, and stores one or more offset numbers, an offset value corresponding thereto, and a flag indicating validity or invalidity.

In addition, the machining unit 110 successively records a relationship between a path of a tool and an offset number during machining or machining simulation. For example, the machining unit 110 has a path-offset number correspondence table, and associates one or more paths designated by the machining program with an offset number validated during execution of machining of the path to record the one or more paths and the offset number associated with each other in the path-offset number correspondence table. The offset number validated during execution of machining may be obtained by referring to the offset table.

The measurement unit 120 measures a shape of the workpiece after machining according to a measurement program. A theoretical value of the workpiece (generally a design value of the workpiece) is set in advance in the measurement program. When there is a difference between a measured value and the theoretical value of the workpiece, the measurement unit 120 detects the difference as a deviation amount. In this instance, the measurement unit 120 successively records a relationship between coordinates of a measurement point at which the deviation amount is detected and the deviation amount. For example, the measurement unit 120 has a measurement point-deviation amount correspondence table, and associates the coordinates of the measurement point at which the deviation amount is detected with the deviation amount to record the coordinates and the deviation amount associated with each other in the measurement point-deviation amount correspondence table.

The correction unit 130 identifies an offset number at the time of machining the vicinity of the measurement point at which the deviation amount is detected. For example, the correction unit 130 obtains the coordinates of the measurement point at which the deviation amount is detected with reference to the measurement point-deviation amount correspondence table. Subsequently, one or more stored paths are obtained with reference to the path-offset number correspondence table. The correction unit 130 calculates distances between the coordinates of the measurement point at which the deviation amount is detected and the obtained paths in order, and identifies a path in a shortest distance. The correction unit 130 obtains an offset number associated with the path closest to the measurement point at which the deviation amount is detected with reference to the path-offset number correspondence table.

In addition, the correction unit 130 corrects an offset value corresponding to the offset number at the time of machining the vicinity of the measurement point at which the deviation amount is detected. For example, the correction unit 130 identifies a record having the offset number associated with the path closest to the measurement point at which the deviation amount is detected with reference to the offset table. Then, the offset value of the record is corrected based on the deviation amount, and content of the record is updated with the offset value after correction.

In this way, the numerical controller 100 of the present embodiment may automatically determine an offset number to be the reflection destination of the deviation amount based on a relationship between the coordinates of the measurement point at which the deviation amount is detected and the tool path and a relationship between the tool path and the offset number. In this way, it is possible to automate work of identifying the offset number corresponding to the reflection destination of the deviation amount which has been conventionally performed by analyzing the program by the operator, etc.

Embodiment 1

Figure 2:
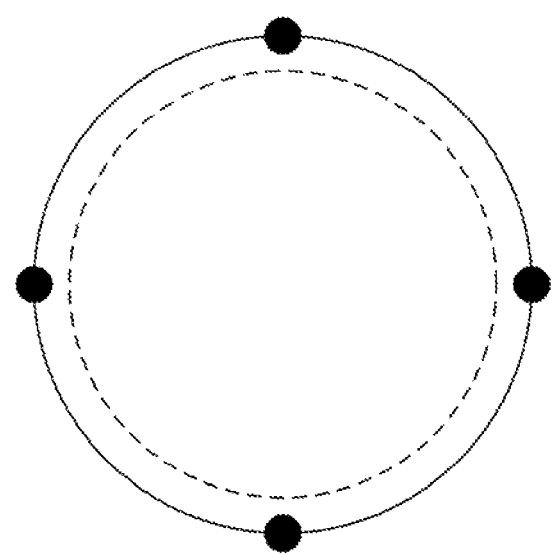
FIG. 2 is a diagram for description of an embodiment of the numerical controller.

An embodiment will be described with reference to FIG. 2 and FIG. 3. FIG. 2 illustrates an actual shape (solid line) of a workpiece after machining and an ideal shape (broken line) based on a design value. Black dots indicate measurement points.

The machining unit 110 machines the workpiece based on the machining program. It is presumed here that a workpiece shape defined by the machining program is a circle having a radius of 10 and a center at coordinates (100, 100). As indicated by the broken line in FIG. 3, the machining unit 110 performs cutting in order along three paths to perform machining to a final workpiece shape. During machining, a machining path commanded by the machining program and an offset number used at this time are recorded in the path-offset number correspondence table.

The measurement unit 120 measures the workpiece after machining based on the measurement program. It is presumed here that the measurement program is set to measure a circle having a radius of 10 and a center at coordinates (100, 100) at four measurement points. A measurement result by the measurement unit 120 corresponds to (89.9, 100.0), (100.0, 110.1), (110.1, 100.0), (100.0, 89.9). This measurement result indicates that the workpiece shape after machining corresponds to a circle having a radius of 10.1 and a center at coordinates (100, 100). That is, a deviation amount of the center is 0, and a deviation amount of the radius is 0.1. The measurement unit 120 records the deviation amount of 0.1 and the coordinates of the four measurement points in the measurement point-deviation amount correspondence table.

To correct this deviation amount, the deviation amount of 0.1 needs to be reflected to the offset value used at the time of machining the vicinity of this measurement point. Therefore, the correction unit 130 identifies an offset number to which the deviation amount needs to be reflected. The measurement unit 120 identifies a path closest to each of the four measurement points among paths stored in the path-offset number correspondence table.

Figure 3:
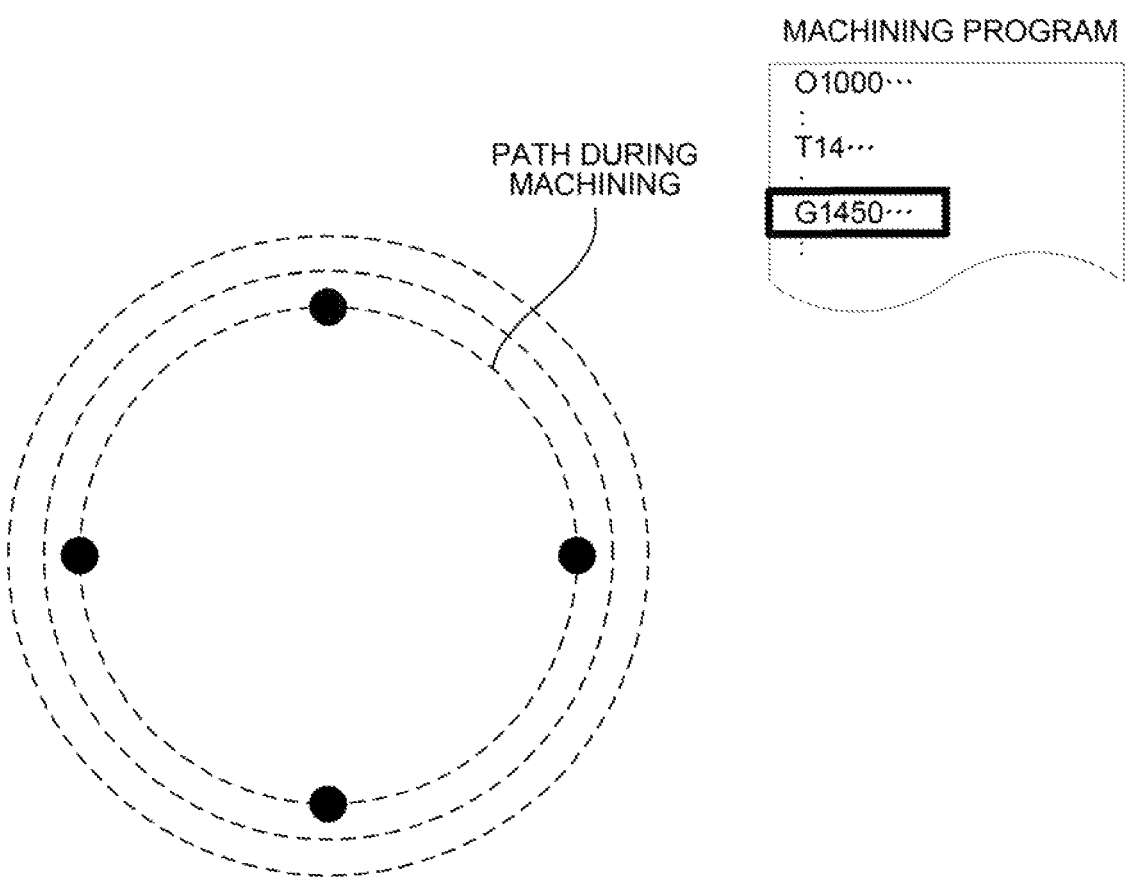
FIG. 3 is a diagram for description of another embodiment of the numerical controller.

In the present embodiment, as illustrated in FIG. 3, an innermost path among three machining paths is closest from any one of the four measurement points (block dots). Therefore, it is sufficient to reflect the deviation amount to the offset value during machining of this path. The correction unit 130 obtains an offset number corresponding to the path with reference to the path-offset number correspondence table. Then, an offset value corresponding to the offset number is corrected based on the deviation amount with reference to the offset table.

In general, the offset number and the offset value are set for each tool. Normally, an offset value is set in accordance with a size or a length of a blade of the tool. However, in the present embodiment, the deviation amount of 0.1 is reflected in this offset value. As illustrated in FIG. 3, when a cutting tool draws a circular path and cuts the workpiece from the outside, it is possible to increase a cutting depth of the tool by subtracting the deviation amount of 0.1 from the offset value.

Embodiment 2

In Embodiment 1, a case in which there is no deviation in center coordinates has been described as an example. However, when there is a deviation in the center coordinates, a reflection destination of a deviation amount thereof corresponds to a workpiece coordinate system. In Embodiment 2, a description will be given of a scheme of reflecting the deviation amount to the workpiece coordinate system.

The machining unit 110 machines a workpiece based on a machining program. It is presumed here that a workpiece shape defined by the machining program is a circle having a radius of 10 and a center at coordinates (100, 100). In Embodiment 2, the machining unit 110 successively records a relationship between a path of a tool and a workpiece coordinate system during machining or machining simulation. For example, the machining unit 110 has a workpiece coordinate system table for defining a workpiece coordinate system used during machining, and stores information defining one or more workpiece coordinate systems and a flag indicating validity or invalidity. In addition, the machining unit 110 has a path-workpiece coordinate system correspondence table, and associates one or more paths designated by the machining program and a workpiece coordinate system validated during execution of machining of the path to record the one or more paths and the workpiece coordinate system associated with each other in the path-workpiece coordinate system correspondence table. The workpiece coordinate system validated during execution of machining may be obtained by referring to the workpiece coordinate system table.

The measurement unit 120 measures a workpiece after machining based on a measurement program. It is presumed here that the measurement program is set to measure a circle having a radius of 10 and a center at coordinates (100, 100) at four measurement points. A measurement result by the measurement unit 120 corresponds to a deviation amount of the center of 0.1 and a deviation amount of the radius of 0. The measurement unit 120 records the deviation amount of the center of 0.1 and coordinates of the four measurement points in the measurement point-deviation amount correspondence table.

To correct this deviation amount, the deviation amount of the center of 0.1 needs to be reflected in a workpiece coordinate system used at the time of machining the vicinity of this measurement point. Therefore, the correction unit 130 identifies the workpiece coordinate system to which the deviation amount needs to be reflected. The measurement unit 120 identifies a path closest to each of the four measurement points among the paths stored in the path-workpiece coordinate system correspondence table. In the present embodiment, as illustrated in FIG. 3, an innermost path among three machining paths is closest from any one of the four measurement points (block dots). Therefore, it is sufficient to reflect the deviation amount to the workpiece coordinate system during machining of this path. The correction unit 130 obtains a workpiece coordinate system corresponding to the path with reference to the path-workpiece coordinate system correspondence table. Then, the workpiece coordinate system is corrected based on the deviation amount of the center with reference to the workpiece coordinate system table.

The embodiments have been described above, but embodiments are not limited only to the above-described embodiments or examples, and may be implemented in various modes by making appropriate changes.

For example, when a plurality of paths is found in the vicinity of a measurement point (that is, when there is a plurality of candidates for a reflection destination of an offset amount), it is possible to determine an offset number to which a deviation amount needs to be reflected using any one of the following methods. The plurality of paths corresponding to the candidates is presented to the operator, and one path selected by the operator is determined as the reflection destination. Alternatively, a path on which machining is finally executed among the plurality of paths corresponding to the candidates is determined as the reflection destination. Alternatively, when machining includes a rough machining cycle and a finishing cycle, a path belonging to the finishing cycle is selected as the reflection destination.

In addition, in the above-described embodiments, a scheme of reflecting a deviation amount to an offset number and a workpiece coordinate system has been described as Embodiment 1 and Embodiment 2. However, the embodiments are not limited thereto. For example, it is possible to automatically determine a reflection destination for a program coordinate system, etc. in a similar manner.

Further, Embodiment 1 (automatic determination of an offset number corresponding to a reflection destination of a deviation amount), Embodiment 2 (automatic determination of a workpiece coordinate system corresponding to a reflection destination of a deviation amount), and other processes of automatically determining a reflection destination of a deviation amount may be executed simultaneously or in order. In this case, for example, the reflection destination of the deviation amount may be determined using a method of presenting a plurality of reflection destinations corresponding to candidates to the operator and allowing the operator to select one reflection destination, etc.

Even though the embodiments have been described above, the embodiments are not limited to the examples of the above-described embodiments, and may be implemented in other modes by making appropriate changes.

The invention claimed is:

1. A numerical controller for correcting automatically an offset value corresponding to an offset number based on a deviation amount corresponding to a difference between a theoretical value and a measured value obtained on processing a workpiece, the numerical controller comprising:
   a machining unit for storing a machining path of the workpiece and the effective offset number during machining of the machining path in association with each other;
   a measurement unit for storing a deviation amount applied to the workpiece and a measurement point at which the deviation amount is detected in association with each other; and
   a correction unit for correcting the offset value corresponding to the offset number based on the deviation amount corresponding to the machining path around the measurement point,
   wherein the correction unit identifies the offset number at the time of the machining in a vicinity of the measurement point at which the deviation amount is detected, and corrects an offset value corresponding to the offset number associated with a path closest to the measurement point at which the deviation is detected.

2. The numerical controller according to claim 1,
   wherein the machining unit stores a machining path of the workpiece and an effective workpiece coordinate system during machining of the machining path in association with each other, and
   the correction unit corrects based on the deviation amount of the workpiece coordinate system corresponding to the machining path around the measurement point.

* * * * *